United States Patent [19]

Chen et al.

[11] Patent Number: 5,593,795
[45] Date of Patent: Jan. 14, 1997

[54] POLYMER ELECTROLYTE COMPOSITION BASED UPON THIOL-ENE CHEMISTRY

[75] Inventors: Kejian Chen; Haitao Huang, both of Woodbury, Minn.

[73] Assignee: Minnesota Mining and Manufacturing Company, St. Paul, Minn.

[21] Appl. No.: 435,110

[22] Filed: May 1, 1995

[51] Int. Cl.[6] .............................. H01M 10/40; H01M 6/18
[52] U.S. Cl. .................................. 429/192; 429/189
[58] Field of Search ............................ 429/189, 192; 427/386

[56] References Cited

U.S. PATENT DOCUMENTS

| | | | |
|---|---|---|---|
| 4,181,752 | 1/1980 | Martens et al. | 427/54.1 |
| 4,200,701 | 4/1980 | Wetton et al. | 525/4 |
| 4,281,072 | 7/1981 | Wetton et al. | 525/4 |
| 4,303,748 | 12/1981 | Armand et al. | 429/192 |
| 4,338,000 | 7/1982 | Kamimori et al. | 350/357 |
| 4,357,401 | 11/1982 | Andre et al. | 429/192 |
| 4,387,222 | 6/1983 | Koshar | 544/4 |
| 4,435,048 | 3/1984 | Kamimori et al. | 350/357 |
| 4,537,826 | 8/1985 | Miyamura et al. | 428/328 |
| 4,556,614 | 12/1985 | le Méhautéet al. | 429/191 |
| 4,888,257 | 12/1989 | Narang et al. | 429/192 |
| 4,908,283 | 3/1990 | Takahashi et al. | 429/192 |
| 5,061,581 | 10/1991 | Narang et al. | 429/192 |
| 5,162,175 | 11/1992 | Visco et al. | 429/192 |
| 5,223,353 | 6/1993 | Ohsawa et al. | 429/192 |
| 5,294,501 | 3/1994 | Chaloner-Gill | 429/192 |
| 5,393,620 | 2/1995 | Manaresi et al. | 429/192 |
| 5,433,876 | 7/1995 | Fauteux et al. | 429/192 |
| 5,453,335 | 9/1995 | Fauteux et al. | 429/192 |
| 5,501,921 | 3/1996 | Olsen | 429/192 |

FOREIGN PATENT DOCUMENTS 57-108831A  7/1982  Japan .......................... G02F 1/17

OTHER PUBLICATIONS

DesMarteau et al., J. Fluor. Chem., "Superacids of Nitrogen and Carbon", vol. 45, p. 24 (1989). No Month.

Osaka et al., J. Electrochem. Soc., "Application of Solid Polymer Electrolyte to Lithium/Polypyrrole Secondary Battery System", vol. 141, No. 8, (Aug. 1994), pp. 1994–1998.

Clancy et al., "Preparation and Characterization of Polymeric Solid Electrolytes from Poly(alkylene sulfides) and Silver Salts", *Macromolecules*, 1986, American Chemical Society, vol. 19, No. 3, pp. 606–611 (No Month).

Grey, F. M., "Polymer Electrolyte Architecture", *Solid Polymer Electrolytes:Fundamentals and Technological Applications*, VCH, New York, 1991, Chapter 6, pp. 95–123 (No Month).

*Primary Examiner*—Stephen Kalafut
*Assistant Examiner*—Carol Chaney
*Attorney, Agent, or Firm*—Gary L. Griswold; Walter N. Kirn; Scott A. Bardell

[57] ABSTRACT

Electrolyte compositions in which a salt is disposed in a thiol-ene matrix. The compositions retain their shape under operating conditions and exhibit an ionic conductivity of at least $1 \times 10^{-6}$ when measured in the absence of solvent at 25° C.

28 Claims, 4 Drawing Sheets

POLYMER ELECTROLYTE COMPOSITION BASED UPON THIOL-ENE CHEMISTRY

BACKGROUND OF THE INVENTION

This invention relates to electrolyte compositions.

Polyethylene oxide (PEO) polymers have been proposed for use as electrolyte compositions for batteries and other applications. Advantages of such polymers include the ability to form lightweight solid (or gelled) films. One problem with such materials, however, is the relatively high degree of crystallinity associated with the PEO polymer which inhibits ion transport (and thus ionic conductivity). It would be desirable to provide an electrolyte composition having the advantages of PEO polymers, but having higher conductivity under ambient conditions.

SUMMARY OF THE INVENTION in one aspect the invention features an electrolyte composition that includes a salt disposed in a matrix. The matrix, in turn, includes the reaction product of (a) a diene-functional alkylene oxide, (b) a di-functional thiol, and (c) a multi-functional reactant having a functionality greater than two comprising a multi-ene-functional reactant, a multi-functional thiol, or combination thereof; in which the relative amounts of alkylene oxide, thiol, and multi-functional reactant having a functionality greater than two are selected such that (a) the composition, when formed into a shape, has sufficient mechanical integrity to retain that shape under operating conditions and (b) the composition exhibits an ionic conductivity of at least $1 \times 10^{-6}$ S/cm when measured in the absence of solvent at 25° C.

In preferred embodiments, the electrolyte composition has an ionic conductivity of at least $5 \times 10^{-6}$ S/cm, and more preferably at least $1 \times 10^{-5}$ S/cm, when measured in the absence of solvent at 25° C.

Preferred di-functional thiols include 1,8-dimercapto-3,6-dioxooctane. Also preferred are mercapto-siloxanes having a functionality equal to two (e.g., tetramethylbis(3-mercaptopropyl)disiloxane).

Preferred diene-functional alkylene oxides include polyalkylene oxide divinyl or diallyl ethers such as triethylene glycol divinyl ether, triethylene glycol diallyl ether, tetraethylene glycol diallyl ether, polyethylene glycol diallyl ether, and combinations thereof. Also preferred are polyalkylene oxide di(meth)acrylates such as tetraethylene glycol di(meth)acrylate.

The amount of multi-functional reactant having a functionality greater than two preferably ranges from about 0.1 to about 20 equivalent percent, more preferably from about 0.1 to about 10 equivalent percent, and even more preferably from about 0.1 to about 5 equivalent percent.

An example of a preferred multi-ene-functional reactant having a functionality greater than two is triallyl cyanurate. Examples of preferred multifunctional thiol reactants having a functionality greater than two include reactants having the formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Thiol reactants having this formula include trimethylolpropane tris(3-mercaptopropionate), pentaerythritol tetra(3-mercaptopropionate), and combinations thereof. Also preferred are reactants that are mercapto-siloxanes having a functionality greater than two (e.g., poly(3-mercaptopropylmethylsiloxane).

The composition may further include an electrolyte solvent.

In a second aspect, the invention features an electrolyte composition that includes a salt disposed in a matrix comprising the crosslinked reaction product of a multi-ene-functional alkylene oxide and a multi-functional thiol. The relative amounts of the alkylene oxide and the thiol are selected such that (a) the composition, when formed into a shape, has sufficient mechanical integrity to retain that shape under operating conditions and (b) the composition exhibits an ionic conductivity of at least $1 \times 10^{-6}$ S/cm when measured in the absence of solvent at 25° C.

In a third aspect, the invention features a method of preparing the above-described electrolyte compositions in the form of a film. The method includes the steps of: (a) providing a solvent-free polymerizable monomeric or prepolymeric syrup that includes a multi-ene-functional alkylene oxide, a multi-functional thiol, and an electrolyte salt; (b) coating a substrate with the syrup; and (c) exposing the syrup to radiation to polymerize the syrup to yield the electrolyte composition. A preferred reaction mixture includes (a) a diene-functional alkylene oxide, (b) a di-functional thiol, and (c) a multi-functional reactant having a functionality greater than two comprising a multi-ene-functional reactant, a multi-functional thiol, or combination thereof.

Preferably, the syrup is exposed to ultraviolet, thermal, or electron beam radiation to polymerize the syrup. Moreover, the syrup is preferably coated onto an electrode.

The invention further features an electrochemical cell having an anode, a cathode, and the above-described electrolyte compositions.

As used throughout this application:

A "polyalkylene oxide" is a polymer or oligomer containing two or more alkylene oxide units.

An "ene" is a reactant having a polymerizable carbon-carbon double bond. A "multi-ene-functional reactant" is a reactant having two or more polymerizable carbon-carbon double bonds.

A "multi-ene-functional alkylene oxide" is an alkylene oxide reactant provided with two or more ene-functional groups. A diene-functional alkylene oxide contains two ene-functional groups. The ene-functional groups may be in the form of end-terminal groups, pendant groups, or a combination thereof so long as the groups are available to participate in the polymerization reaction.

A "multi-functional thiol" is a reactant provided with two or more thiol-functional groups. A di-functional thiol has two thiol-functional groups. As in the case of the alkylene oxide reactants, the thiol-functional groups may be in the form of end-terminal groups, pendant groups, or a combination thereof so long as the groups are available to participate in the polymerization reaction.

"Matrix" refers to a solid or gel medium in which one or more electrolyte salts may be dissolved or dispersed to form an ionically conductive electrolyte composition.

"Equivalent percent" in the case of multi-ene-functional reactants having a functionality greater than two is equal to the number of equivalents of said ene reactants divided by the total number of equivalents of thiol reactants. In the case of multi-functional thiol reactants having a functionality greater than two, "equivalent percent" is equal to the number of equivalents of said thiol reactants divided by the total number of equivalents of ene reactants. Where a combination of multi-functional thiol reactants having a functionality greater than two and multi-ene-functional reactants having a functionality greater than two is used, "equivalent percent" refers to the sum of said ene and thiol reactants divided by the total equivalents of all ene and thiol reactants in the reaction mixture.

The invention provides a lightweight electrolyte composition having sufficient mechanical integrity to allow the composition to retain its shape when applied to a substrate, coupled with relatively high ionic conductivity (even in the absence of solvent). The composition thus provides the benefits of PEO-based electrolyte compositions, but with the advantage of higher conductivity owing to the reduced crystallinity of the thiol-ene polymer relative to PEO. The thiol-ene matrix polymers are also relatively insensitive to the particularly type of electrolyte salt incorporated therein, thus expanding the class of suitable electrolyte salts that can be used.

A further advantage is that the electrolyte compositions are readily prepared using a solvent-free polymerization process that may be conducted either in air or in an inert atmosphere. Became the process is solvent-free, the invention offers advantages from an environmental standpoint. Moreover, polymerization and electrolyte salt incorporation are accomplished in a single step.

Other features and advantages of the invention will be apparent from the following description of the preferred embodiments thereof, and from the claims.

DESCRIPTION OF THE PREFERRED EMBODIMENTS

Figure 1:
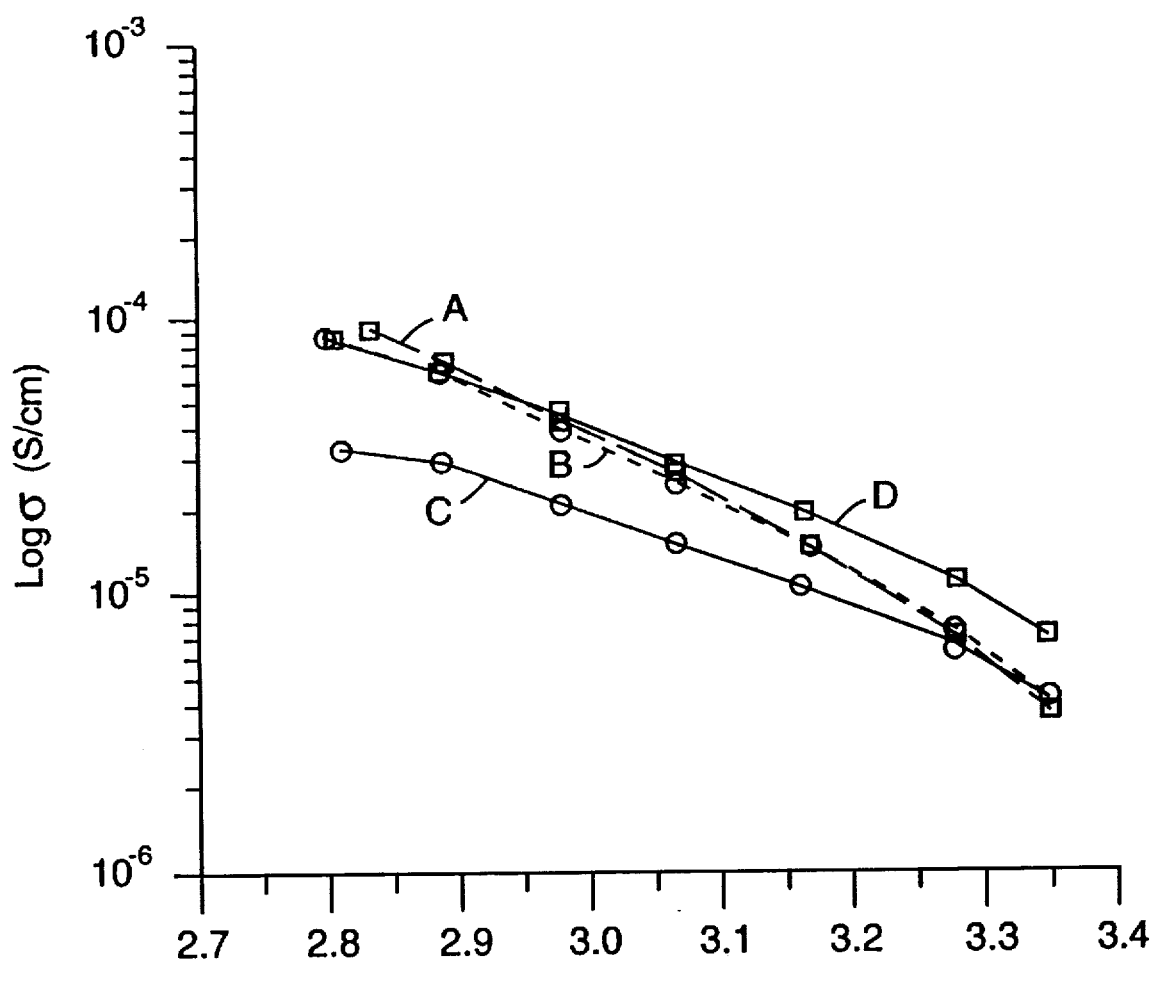
FIG. 1 is an Arrhenius plot showing conductivity of various electrolyte compositions as a function of lithium to (oxygen plus sulfur) ratio.

Electrolyte compositions according to the invention include a polymer matrix in which is disposed one or more electrolyte salts. The polymer matrix is preferably the reaction product of one or more di-functional thiols, one or more diene-functional alkylene oxides, and one or more multi-ene-functional reactants, multi-functional thiols, or combination thereof, each having a functionality greater than two. However, the polymer matrix may also be the reaction product of (a) a multifunctional thiol having a functionality greater than two and a diene-functional alkylene oxide, (b) a di-functional thiol and a multi-ene-functional alkylene oxide having a functionality greater than two, or (c) a multi-functional thiol having a functionality greater than two and a multi-ene-functional alkylene oxide having a functionality greater than two if the multi-functional reactants have a relatively high molecular weight between functional groups.

The reactants are chosen such that the electrolyte composition has sufficient mechanical integrity to retain its shape (e.g., when prepared in the form of a film), but does not substantially impede ion transport through the electrolyte (as measured by the ionic conductivity of the electrolyte composition). In general, the ionic conductivity of the electrolyte composition (measured as described below in the absence of solvent at 25 °C.) is at least $1\times 10^{-6}$ S/cm, more preferably at least $5\times 10^{-6}$ S/cm, and most preferably at least $1\times 10^{-5}$ S/cm. In addition, the reactants may be adjusted to achieve a particular tack level to provide sufficient adhesion between the electrolyte and a substrate such as an electrode to which the electrolyte is applied.

Examples of suitable di-functional thiols include 1,8-dimercapto-3,6-dioxoocane, bis-(2-mercaptoethyl) ether, bis-(2-mercaptoethyl) sulfide, ethane dithiol, and di-thiols having the formula

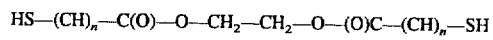

$$HS-(CH)_n-C(O)-O-CH_2-CH_2-O-(O)C-(CH)_n-SH$$

such as ethylene glycol bis(mercapto acetate) (n=1) and ethylene glycol bis(mercapto propionate) (n=2). Also preferred are mercapto-siloxanes having a functionality equal to two (e.g., tetramethylbis(3-mercaptopropyl)disiloxane and higher analogs thereof). The thiol may also be provided with a variety of functional groups, including,

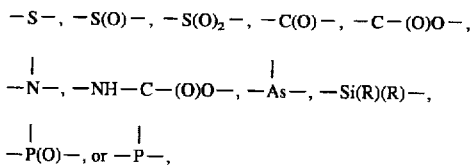

or combination thereof.

Examples of suitable diene-functional alkylene oxides include alkylene oxides having the formula $[(CHR^1)_n(CHR^2O)_m]_x$ (where $R^1$ and $R^2$, independently, are H or a $C_1$–$C_3$ alkyl group, and m and n, independently, are 1–4) provided with two ene-functional groups, or copolymers thereof. Examples of suitable ene-functional groups include allyls, (meth)acrylates, (meth)acrylamides, vinyl silanes, vinyl ethers, fumarates, maleates, styryls, norbomenyls, and combinations thereof. Particularly preferred are polyethylene glycol-based divinyl ethers having the general formula:

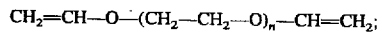

$$CH_2=CH-O-(CH_2-CH_2-O)_n-CH=CH_2;$$

polyethylene glycol-based diallyl ethers having the general formula:

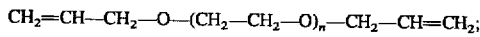

$$CH_2=CH-CH_2-O-(CH_2-CH_2-O)_n-CH_2-CH=CH_2;$$

and polyethylene glycol-based di(meth)acrylates. Specific examples include triethylene glycol divinyl ether, tetraethylene glycol di(meth)acrylate, triethylene glycol diallyl ether, tetraethylene glycol diallyl ether, polyethylene glycol diallyl ether, and allyl-functional oligomers such as 9460 commercially available from Monomer-Polymer & Dajac Laboratories, Feastville, Pa. The alkylene oxide may further be provided with a variety of functional groups, including

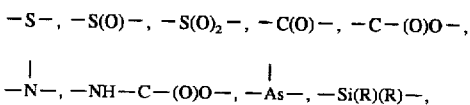

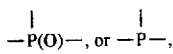

or combination thereof.

In general, the amount of multi-functional reactant having a functionality greater than two ranges from about 0.1 to about 20 equivalent percent, preferably from about 0.1 to about 10 equivalent percent, and more preferably from about 0.1 to about 5 equivalent percent, with reactants having higher functionalities falling at the lower end of the range.

Examples of suitable multi-functional thiols having a functionality greater than two include those having the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Specific examples include trimethylolpropane tris(3-mercaptopropionate), pentaerythritol tetra(3-mercaptopropionate), and combinations thereof. Also useful are mercapto-functional siloxanes (e.g., poly(3-mercaptopropylmethylsiloxane), or oligomers or copolymers thereof; siloxanes such as those commercially available from United Chemical Technologies, Inc. under the trade designation "PS405"; and combinations thereof. In addition, tri-functional thiols such as those commercially available from Henkel Corp. under the designation "Copure™ 3-800" and from Morton International as the "Liquid Polysulfide Polymer Series" can be used.

Examples of suitable enes having functionalities greater than two include allyl ethers, vinyl ethers, and (meth)acrylates. Specific examples of allyls include triallyl isocyanurate, allyl-functional urethane oligomers, and allyl-functional siloxanes. Examples of acrylates and methacrylates include trimethylpropane triacrylate and pentaerythritol tetraacrylate. Examples of vinyl ethers include trimethanolpropane trivinyl ether.

As a consequence of the thiol-ene matrix materials described above, a wide variety of electrolyte salts can be used in electrolyte compositions according to the invention. Such salts are well-known and include alkali metal, alkaline earth metal, and Group IIIB metal (e.g., aluminum) salts of anions such as $BF_4^-$; $PF_6^-$; $AsF_6^-$; $ClO_4^-$; $SbF_6^-$; $R_fSO_3^-$ (in which $R_f$ is a perfluoroalkyl group having between 1 and 12 carbon atoms, inclusive); a bis-sulfonamide anion ($R_f$—$SO_2$—N—$SO_2$—$R_f'$) in which $R_f$ and $R_f'$, independently, are perfluoroalkyl groups having between 1 and 12 carbon atoms, inclusive; a bis-sulfonyl methide anion (R—$SO_2$—$C^-(R)$—$SO_2$—$R_f'$) in which $R_f$ and $R_f'$, independently, are perfluoroalkyl groups having between 1 and 12 carbon atoms, inclusive, and R is H, Br, Cl, I, an alkyl group having between 1 and 20 carbon atoms, inclusive, aryl, or alkylaryl; and a tris-sulfonylmethide anion (—$C(SO_2R_f)SO_2R_f')(SO_2R_f'')$) in which $R_f$, $R_f'$, and $R_f''$, independently, are perfluoroalkyl groups having between 1 and 12 carbon atoms, inclusive. Such salts also include cyclic perfluoroaliphatic disulfonimide salts, such as those described in U.S. Pat. No. 4,387,222 (Koshar), and metal salts of acids, such as those described by DesMarteau et al. in J. Fluor. Chem. 45, 24 (1989).

Representative examples of suitable salts include $LiBF_4$, $LiAsF_6$, $LiClO_4$, $LiPF_6$, $CF_3SO_3Li$, $C_2F_5SO_3Li$, $C_{10}F_{21}SO_3Li$, $(CF_3SO_2)_2NLi$, $(CF_3SO_2)_2NNa$, $[(CF_3SO_2)_2N]_3Al$, $(CF_3SO_2)_2C(H)Li$, cyclo-$(CF_2SO_2)_2NLi$, cyclo-$(CF_2SO_2)_2C(H)Li$, $(CF_3SO_2)_3CLi$, and mixtures thereof.

Preferably, the ratio of the total number of oxygen and sulfur atoms in the thiol-ene polymer to the number of salt cations ranges from about 5 to about 40, with ratios of between 10 and 20 being most preferred.

The electrolyte compositions according to the invention are preferably prepared by photoinitiated bulk polymerization according to the technique described in Martens et al., U.S. Pat. No. 4,181,752, hereby incorporated by reference. The reactants, electrolyte salt, and a photoinitiator are mixed together in the absence of solvent and preferably partially polymerized to a viscosity in the range of from about 10 cps to about 50,000 cps to achieve a coatable syrup.

The resulting composition is coated onto a substrate such as an electrode, e.g., according to the technique described in Vesley et al., U.S. Ser. No. 08/235,366 entitled "Precision Coating Process for Preparing Polymerizable Films," assigned to the same assignee as the present application and hereby incorporated by reference, and polymerized by exposure to ultraviolet radiation. Low intensity ultraviolet lamps with different spectral outputs are commercially available and preferably used, although high intensity lamps may be used as well. The lamp should be selected such that the maximum output of the lamp is near the maximum absorption of the initiator. Fluorescent lamps (e.g., F40T12-350BL lamps commercially available from Osram Sylvania, Danvers, MA) in which the intensity of each lamp bank is in the range of about 0.25 to 10 mW/cm² (more preferably in the range of about 0.5 to 5 mW/cm²) are suitable for this application. The total radiation to which the reactants are exposed preferably is in the range of about 100 to 1500 mJ/cm². The particular radiation intensity and total energy exposure requirements will vary depending on the initiator and reactants.

The amount of photoinitiator generally ranges from about 0.01 to about 10 parts per 100 parts of reactants. Examples of suitable polymerization initiators include benzoin ethers, substituted benzoin ethers such as benzoin methyl ether or benzoin isopropyl ether, substituted acetophenones such as 2,2-diethoxy-acetophenone, and 2,2-dimethoxy-2-phenylacetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ethoxycarbonyl) oximes. Other suitable initiators include 2,4-bis-trichloro-methyl-6-substituted-s-triazines, and benzophenone with an amine (for example and p-N,N-diethylamino) ethyl benzoate). Sensitizers such as phenanthrene may be used in conjunction with the photoinitiators as well.

Polymerization may also be carried out by exposure to thermal radiation (in which case a thermal initiator is included) or electron beam radiation (which does not require the use of an initiator). Electron beam radiation has the advantage that it can be used in conjunction with non-ultraviolet/visible transparent substrates such as filled electrodes. Thus, the same material can be used for both the electrolyte composition and one (or both) of the electrodes, thereby eliminating interfaces between electrolyte and electrode that can impede ion transport.

Following polymerization, the electrolyte compositions may be swollen (if desired) with solvent. Aprotic liquids are preferred. Such liquids are generally dry (e.g., have a water content less than about 100 ppm, preferably less than about 50 ppm). Examples of suitable aprotic liquids include linear ethers such as diethyl ether and 1,2-dimethoxyethane; cyclic ethers such as tetrahydrofuran, 2-methyltetrahydrofuran, dioxane, dioxolane, and 4-methyldioxolane; esters such as methyl formate, ethyl formate, methyl acetate, diethyl carbonate, propylene carbonate, ethylene carbonate, and butyrolactones; nitriles such as acetonitrile and benzonitrile;

nitro compounds such as nitromethane or nitrobenzene; amides such as N,N-dimethylformamide, N,N-diethylformamide, and N-methylpyrrolidone; sulfoxides such as dimethyl sulfoxide; sulfones such as dimethylsulfone, tetramethylene sulfone, and other sulfolanes; oxazolidones such as N-methyl-2-oxazolidone; and mixtures thereof.

As stated above, the electrolyte compositions according to the invention generally have conductivities of at least about $1 \times 10^{-6}$ S/cm at 25° C. (measured in the absence of solvent). The compositions thus find application in a wide variety of areas, including primary and secondary batteries (e.g., lithium batteries), sensor, capacitors, and electrochromic devices (e.g., for use as optical shutters or displays).

The invention will now be described further by way of the following examples.

EXAMPLES

EXAMPLE 1

A mixture of triethylene glycol divinyl ether (6.068 gm, 30 mmol, available from Aldrich Chemicals, Milwaukee, Wis.), tetmmethylbis(3-mercaptopropyl)disiloxane (7.198 gm, 27 mmol, available from United Chemicals Technologies, Inc. Bristol, Pa.), trimethylopropane tri(2-mercaptoacetate) (0.797 gm, 2 mmol, available from Aldrich Chemicals, Milwaukee, Wis.), benzophenone (120 rag, available from Aldrich Chemicals, Milwaukee, Wis.), and lithim trifluoromethanesulfonyl imide (1.435 gm, 5 mmol, available from 3M, St. Paul, Minn.) was shaken in a sealed glass bottle under ambient conditions until all solids had dissolved (approximately 2 hours). The resulting solution was irradiated with a black light ($\lambda_{max}$365 nm) for~20 sec. to obtain a coatable prepolymer syrup. A 0.0127 mm thick coating of the resulting syrup was applied to a silicone treated polyester release liner using a knife coater, a second silicone treated release liner placed over the syrup, and the syrup polymerized by passing the laminate between two banks of fluorescent lamps (F40T12-350BL lamps commercially available from Osram Sylvania, Danvers, Mass.) for a total residence time of about 3.5 minutes. The UV light profile was 330 mJ, 1.5 mW and 300 mJ, 1.3 mW for the top and bottom lights, respectively, as measured with a UVIMAP Model# UM365H-S photometer (available from EIT Electronic Instrumentation Technology, Inc., Stealing Va.). The resulting polymer electrolyte film was a clear, slightly tacky film which was readily removed from the release liners. The conductivity of the electrolyte film, which was measured by laminating a sample of the film between two pieces of zinc foil (approximately 22 cm×25 cm) and measuring its ac impedance using a Schlumberger FRA 1260 Impedance/Gain Phase Analyzer linked to a computer controlled PARC 273A potentiostat, was $3.3 \times 10^{-5}$ S/cm.

EXAMPLE 2

A polymer electrolyte film was prepared according to the procedure of Example 1 except that the reaction mixture consisted of triethylene glycol divinyl ether (4.045 gm, 20 mmol), tetramethylbis(3-mercaptoprolyl)disiloxane (5.066 gin, 19 mmol), poly(3-mercaptopropyl)methyldisiloxane (0.320 gm, 2 mmol, available from United Chemicals Technologies, Inc.), dimethoxybenzil (KB-1, 20 mg, available from Sartomer Chemical, Exton, Pa.), and lithium trifluoromethanesulfonyl imide (1.435 gm, 5 mmol). (The molar equivalent weight of poly(3-mercaptopropyl)methyldisiloxane was based on a repeat unit of OSi(Me)CH$_2$CH$_2$CH$_2$SH.) The resulting polymer electrolyte film had a conductivity of $2.0 \times 10^{-5}$ S/cm.

EXAMPLE 3

A polymer electrolyte film was prepared according to the procedure of Example 1 except that the reaction mixture consisted of triethylene glycol divinyl ether (2.022 gm, 10 mmol), 1,8-dimercapto-4,6-dioxooctane (1.732 gm, 9.5 mmol, available from Nisso Maruzen Chemical, Tokyo, Japan ), poly(3-mercaptopropyl)methyldisiloxane (0.090 g 0.56 mmol), dimethoxybenzil (KB-1, 12 mg), and lithium trifluoromethanesulfonyl imide (2.296 gm, 8 mmol). The resulting polymer electrolyte film had a conductivity of $1.7 \times 10^{-5}$ S/cm.

EXAMPLE 4

A polymer electrolyte film was prepared according to the procedure of Example 1 except that the reaction mixture consisted of triethylene glycol divinyl ether (2.188 gm, 9.5 mmol), 1,8-dimercapto4,6-dioxooctane (1.732 gm, 9.5 mmol), triallyl cyanuarate (0.025 gm, 0.1 mmol, available from Aldrich Chemicals, Milwaukee, Wis.), benzophenone (BP, 20 mg), and lithium trifluoromethanesulfonyl imide (2,296 gm 8 mmol). The resulting polymer electrolyte film had a conductivity of $2.1 \times 10^{-5}$ S/cm.

EXAMPLE 5

A polymer electrolyte film was prepared according to the procedure of Example 1 except that the reaction mixture consisted of triethylene glycol diallyl ether (2.188 gm, 9.5 mmol, prepared as described below), 1,8-dimercapto4,6-dioxooctane (1.823 gm, 10 mmol), pentaerythitol tetra-allyl ether (0.148 gm, 0.5 mmol, available from Monomer-Polymer & Dajac Labs, Feasterville, Pa.), dimethoxybenzil (KB-1, 8 mg), and lithium trifluoromethanesulfonyl imide (2.296 gm, 8 mmol). The triethylene glycol diallyl ether was prepared by adding allyl bromide (48.0 gm, 0.4 mol) dropwise, to a mixture of triethylene glycol (30.34 gm, 0.2 mol) and sodium hydroxide (10.0 gm, 0.25 mol) and refluxing the resulting mixture for 4 hours. The reaction mime was cooled to room temperature, diluted with ether (100 mL), and the precipitate removed by filtration. The filtrate was washed with 5% HCl (100 mL), sainted sodium bicarbonate (100 mL), and dried over anhydrous sodium sulfate. The sodium sulfate was removed by filtration, the ether stripped on a rotary evaporator, and the crude product distilled under vacuum. The structure of the distilled product was confirmed by NMR analysis. The resulting polymer electrolyte film had a conductivity of $2.9 \times 10^{-5}$ S/sm.

EXAMPLE 6

A polymer electrolyte film was prepared according to the procedure of Example 1 except that the reaction mixture consisted of tetraethylene glycol diallyether (2.605 gm, 9.5 mmol (prepared according to the procedure used to prepare triethylene glycol diallyl ether described in Example 5, but substituting the appropriate molar quantity of tetraethylene glycol for the triethylene glycol), 1,8-dimercapto-4,6-dioxooctane (1.823 gm, 10 mmol), pentaerythitol tetra-allyl ether (0.148 gm, 0.5 mmol), dimethoxybenzil (KB-1, 8 mg), and lithium trifiuoromethanesulfonyl imide (2.583 gm, 9 mmol). The resulting polymer electrolyte film had a conductivity of $5.1 \times 10^{-5}$ S/cm.

EXAMPLE 7

A polymer electrolyte film was prepared according to the procedure of Example 1 except that the reaction mixture consisted of polyethylene glycol 400 diallyether (4.598 gm, 9.5 mmol (prepared but substituting the appropriate molar quantity of polyethylene glycol 400 for the triethylene glycol), 1,8-dimercapto-4,6-dioxooctane (1.823 gm, 10 mmol), pentaerythitol tetra-allyl ether (0.148 gm, 0.5 mmol), dimethoxybenzil (KB-1, 8 mg), and lithium trifluoromethanesulfonyl imide (4.020 gm, 14 mmol). The resulting polymer electrolyte film had a conductivity of $3.9 \times 10^{-5}$ S/cm.

EXAMPLE 8

A polymer electrolyte film was prepared according to the procedure of Example 1 except that the reaction mixture consisted of tetraethylene glycol diacrylate (3.023 gm, 10 mmol, available from Aldrich Chemicals, Milwaukee, Wis.), 1,8-dimercapto-3,6-dioxooctane (1.732 gm, 9.5 mmol, available from Nisso Mamzen Chemical), poly(3-mercaptopropyl)methyldisiloxane (0.067 gm, 0.50 mmol), dimethoxybenzil (KB-1, 15 mg), and lithium trifluoromethanesulfonyl imide (2.583 gm, 9 mmol). The resulting polymer electrolyte film had a conductivity of $2.8 \times 10^{-5}$ S/cm.

EXAMPLE 9

A series of four polymer electrolyte films were prepared according to the procedure of Example 1 except that the polymer matrix for all four samples was based on a reaction mixture consisting of triethylene glycol divinyl ether (DVE-3, 1.980 gm, 9.85 mmol), 1,8-dimercapto-3,6-dioxooctane (1.823 gm, 10.0 mmol), triallyl cyanuarate (0.025 gm, 0.1 mmol), and dimethoxybenzil (KB-1, 4 mg). The concentration of lithium trifluoromethanesulfonate (available from 3M, St. Paul, Minn.) was systematically increased over the range indicated in Table 1 to provide a range of Li/(O+S) ratios, also indicated in Table 1. Cells were constructed with each polymer electrolyte film by laminating the film between two circular polished stainless steel electrodes, mounting the thus formed cells in aluminum cans with springs, and hermetically sealing the can.

TABLE 1

| | Conductivity as a Fraction of Li/(O + S) Ratio | | |
|---|---|---|---|
| Sample | Gm $LiN(SO_2CF_3)_2$ | Mmol $LiN(SO_2CF_3)_2$ | Li/(O + S) Ratio |
| 9a | 2.870 | 10 | 1/8 |
| 9b | 2.296 | 8 | 1/10 |
| 9c | 1.148 | 4 | 1/20 |
| 9d | 0.574 | 2 | 1/40 |

(The process of preparing the cells, mounting the cells in the can and sealing the can was carried out in an inerted dry box.) The cans were placed in a temperature controlled oven and the conductivity of each film determined over a temperature range of 23–80° C. Arrhenius plots of the data obtained from these studies, which are presented in FIG. 1, where curve A corresponds to sample 9a, curve B corresponds to sample 9b, curve C corresponds to sample 9c, and curve D corresponds to sample 9d, demonstrates that the polymer electrolyte films of the present invention have good conductivity over a wide range of Li/(O+S) ratios.

EXAMPLE 10

A series of polymer electrolyte films were prepared according to the procedure of Example 9 except that the Li/(O+S) ratio was held constant at 1/20 and four different Li salts were incorporated into the polymer electrolyte formulations as indicated in Table 2.

TABLE 2

| | Conductivity as a Function of Type of Li Salt | | |
|---|---|---|---|
| Sample | Li Salt | Gm Salt | Mmol Salt |
| 10a | $LiN(SO_2CF_3)_2$[1] | 1.148 | 4 |
| 10b | $LiO_3SCF_3$[1] | 0.624 | 4 |
| 10c | $LiO_3SC_4F_9$[1] | 1.224 | 4 |
| 10d | $LiClO_4$[2] | 0.425 | 4 |

[1] Available from 3M
[2] Available from Aldrich Chemical.

Figure 2:
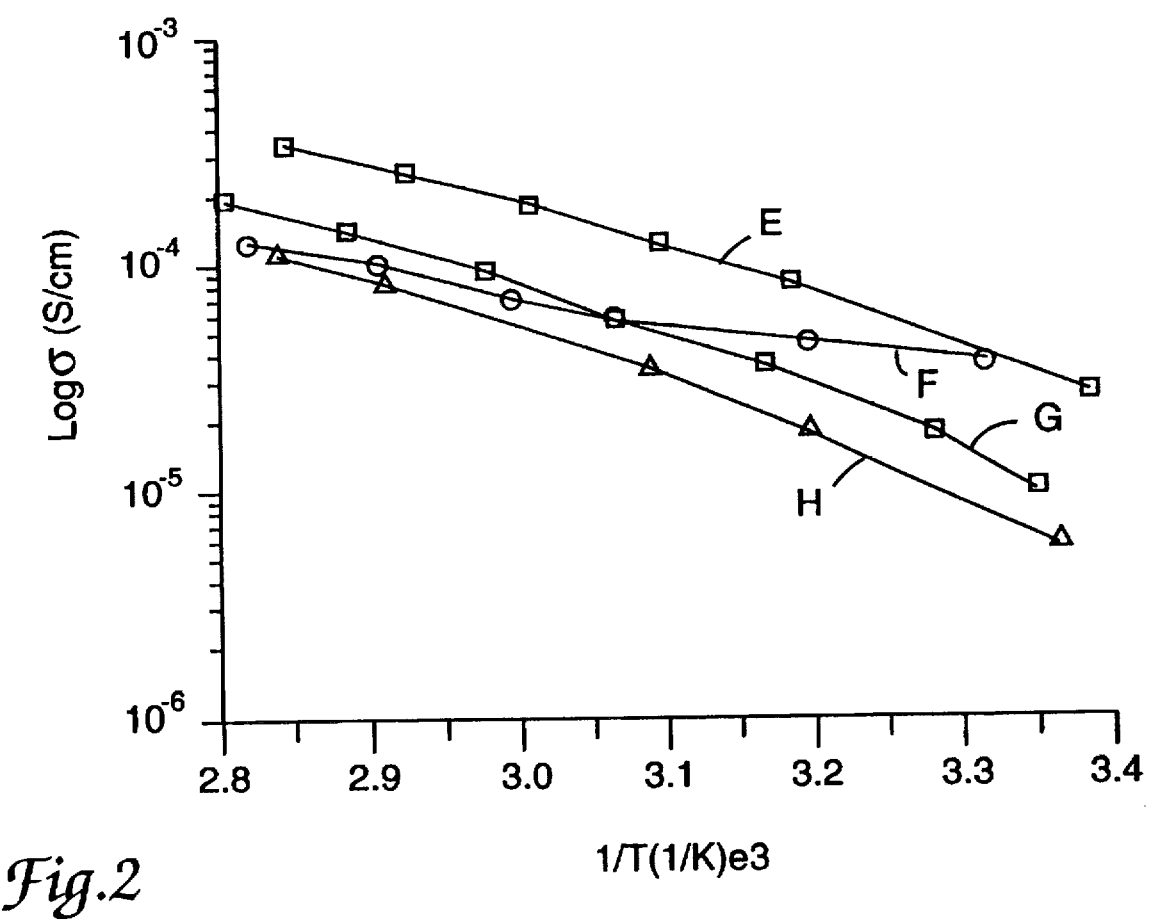
FIG. 2 is an Arrhenius plot showing conductivity of various electrolyte compositions as a function of type of lithium salt.

Arrhenius plots of the data obtained from these studies, which are presented in FIG. 2, where curve E corresponds to sample 10a, curve F corresponds to sample 10b, curve G corresponds to sample 10c, and curve H corresponds to sample 10d, demonstrates that the polymer electrolyte films of the present invention have good conductivity with a range of salts, several of which do not exhibit a plasticizing effect on the polymer electrolyte.

EXAMPLE 11

A series of polymer electrolyte films were prepared according to the procedure of Example 9 except that the Li/(O+S) ratio was held constant at 1/20 and the crosslinker level was systematically varied from 0.6% to 6.0%, where the crosslinker level was defined as (meq triallyl cyanuarate/ meq dithiol)×100%. These preparations were carried out at a X level of the preparations described in Example 9. Actual weights and molar equivalents of the triallyl cyanuarate used in the various samples is indicated in Table 3.

TABLE 3

| | Conductivity as a function of Crosslink Density | | | | |
|---|---|---|---|---|---|
| Sample | Gm DVE-3 | meq DVE-3 | Gm Triallyl Cyanurate | Mmol Triallyl Cyanurate | X-linker Level (%) |
| 11a | 16.128 | 79.76 | 19.942 | 0.06 | 0.6 |
| 11b | 16.080 | 79.52 | 39.8844 | 0.12 | 1.2 |
| 11c | 16.032 | 79.28 | 59.824 | 0.18 | 1.8 |
| 11d | 15.984 | 79.04 | 79.768 | 0.24 | 2.4 |
| 11e | 15.936 | 78.80 | 99.708 | 0.30 | 3.0 |
| 11f | 15.816 | 79.24 | 149.564 | 0.45 | 4.5 |
| 11g | 15.696 | 77.60 | 199.416 | 0.60 | 6.0 |

Figure 3:
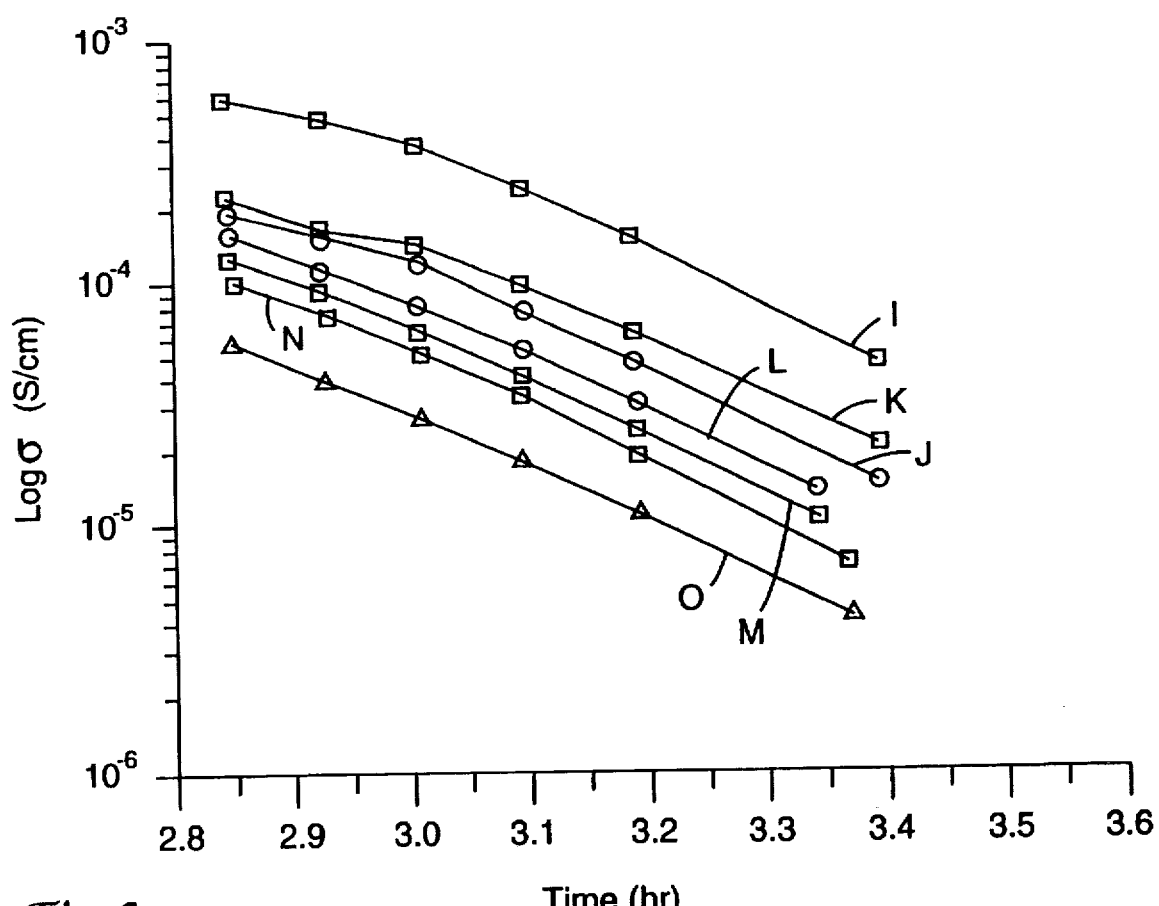
FIG. 3 is an Arrhenius plot showing conductivity of various electrolyte compositions as a function of crosslinking level.

Arrhenius plots of the data obtained from these studies, which are shown in FIG. 3, demonstrates that within the crosslinker range studied, lower crosslinker levels produced higher conductivities in the polymer electrolytes of the present invention.

EXAMPLE 12

Figure 4:
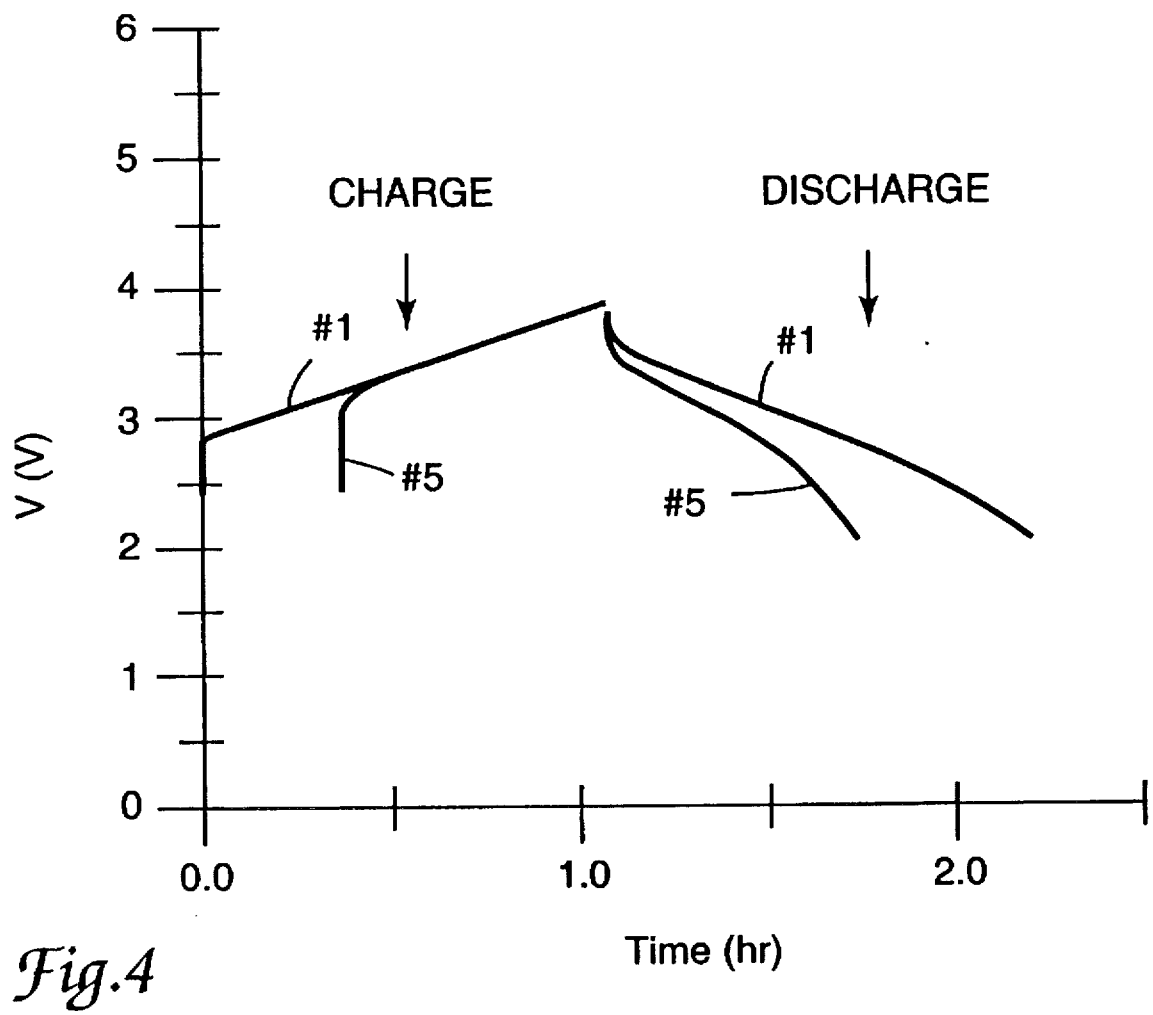
FIG. 4 is a charged/discharge curve for the first and fifth cycles of a lithium-polypyrrole battery according to the invention.

A 5.9 $cm^2$ Li/polypyrrole battery cell was assembled by laminating a 127 μm thick film of sample 10d between a lithium foil (152 μm thick) and a polypyrrole film deposited on a platinum foil, which was prepared according to the procedure described by Osaka et. al. in J. Electrochem. Soc., 141, (1994), pp 1994–1998. The polypyrrole film was formed on the platinum foil by an electro-oxidative polymerization at 4.2 volts vs. Li/Li+ in propylene carbonate containing 0.2 M LiClO$_4$ and 0.2 M pyrrole. Polymerization was terminated after passing a charge of 0.5 C/cm$^2$. The polypyrrole film was washed twice with 0.2 M LiClO$_4$ and dried overnight under vacuum at 80° C. The cell was placed in an aluminum can as described in Example 9 and subjected to charge-discharge cycling at 78° C. on a Maccor 2000 battery test system (available from Maccor, Inc. Tulsa, Okla.). The charge-discharge curve for the first and fifth cycles of this cell, which were obtained at a current density of 0.017 mA/cm$^2$, are shown in FIG. 4.

What is claimed is:

1. An electrolyte composition comprising a salt disposed in a matrix comprising the reaction product of (a) a diene-functional alkylene oxide, b) a di-functional thiol, and (c) a multi-functional reactant having a functionality greater than two comprising a multi-ene-functional reactant, multi-functional thiol, or combination thereof, the relative amounts of said alkylene oxide, said thiol, and said multi-functional reactant having a functionality greater than two being selected such that (a) said composition, when formed into a shape, has sufficient mechanical integrity to retain said shape under operating conditions and (b) said composition exhibits an ionic conductivity of at least 1×10$^{-6}$ S/cm when measured in the absence of solvent at 25° C.

2. The electrolyte composition of claim 1 having an ionic conductivity of at least 5×10$^{-6}$ S/cm when measured in the absence of solvent at 25° C.

3. The electrolyte composition of claim 1 having an ionic conductivity of at least 1×10$^{-5}$ S/cm when measured in the absence of solvent at 25° C.

4. The electrolyte composition of claim 1 wherein said di-functional thiol comprises 1,8-dimercapto-3,6-dioxooctane.

5. The electrolyte composition of claim 1 wherein said di-functional thiol comprises a mercapto-siloxane having a functionality equal to two.

6. The electrolyte composition of claim 1 wherein said di-functional thiol comprises tetramethylbis(3-mercaptopropyl)disiloxane.

7. The electrolyte composition of claim 1 wherein said diene-functional alkylene oxide comprises a polyalkylene oxide divinyl or diallyl ether.

8. The electrolyte composition of claim 1 wherein said diene-functional alkylene oxide comprises triethylene glycol divinyl ether, triethylene glycol diallyl ether, tetraethylene glycol diallyl ether, polyethylene glycol diallyl ether, or a combination thereof.

9. The electrolyte composition of claim 1 wherein said diene-functional alkylene oxide comprises a polyalkylene oxide di(meth)acrylate.

10. The electrolyte composition of claim 1 wherein said diene-functional alkylene oxide comprises tetraethylene glycol di(meth)acrylate.

11. The electrolyte composition of claim 1 wherein said multi-functional reactant having a functionality greater than two comprises a reactant having the formula Z[OCO(CH$_2$)$_n$SH]$_m$ where Z is a polyvalent organic moiety which is a CH$_{0-3}$ group-containing nucleus of a tri- or tetravalent alcohol of the type of glycerol or pentaerythritol, m is 3 or 4, and n is an integer between 1 and 5, inclusive.

12. The electrolyte composition of claim 1 wherein said mutli-functional reactant having a functionality greater than two comprises trimethylolpropane tris(3-mercaptopropionate), pentaerythritol tetra(3-mercaptopropionate), or a combination thereof.

13. The electrolyte composition of claim 1 wherein said multi-functional reactant having a functionality greater than two comprises a mercapto-siloxane having a functionality greater than two.

14. The electrolyte composition of claim 1 wherein said multi-functional reactant having a functionality greater than two comprises poly(3-mercaptopropylmethylsiloxane).

15. The electrolyte composition of claim 1 wherein said multi-functional reactant having a functionality greater than two comprises triallyl cyanurate.

16. The electrolyte composition of claim 1 comprising from about 0.1 to about 20 equivalent percent of said multi-functional reactant having a functionality greater than two.

17. The electrolyte composition of claim 1 comprising from about 0.1 to about 10 equivalent percent of said multi-functional reactant having a functionality greater than two.

18. The electrolyte composition of claim 1 comprising from about 0.1 to about 5 equivalent percent of said multi-functional reactant having a functionality greater than two.

19. The electrolyte composition of claim 1 further comprising an electrolyte solvent.

20. An electrolyte composition comprising a salt disposed in a matrix comprising the crosslinked reaction product of a multi-ene-functional alkylene oxide and a multi-functional thiol, the relative amounts of said alkylene oxide and said thiol being selected such that (a) said composition, when formed into a shape, has sufficient mechanical integrity to retain said shape under operating conditions and (b) said composition exhibits an ionic conductivity of at least 1×10$^{-6}$ S/cm when measured in the absence of solvent at 25° C.

21. A method of preparing an electrolyte composition in the form of a film comprising the steps of:

(a) providing a solvent-flee polymerizable monomeric or prepolymeric syrup comprising a multi-ene-functional alkylene oxide, a multi-functional thiol, and an electrolyte salt;

(b) coating a substrate with said syrup; and (c) exposing said syrup to radiation to polymerize said syrup to yield an electrolyte composition comprising an electrolyte salt disposed in a matrix, the relative amounts of said alkylene oxide and said thiol being selected such that (a) said matrix, when formed into a shape, has sufficient mechanical integrity to retain said shape under ambient conditions and (b) said composition exhibits an ionic conductivity of at least 1×10$^{-6}$ S/cm when measured in the absence of solvent at 25° C.

22. The method of claim 21 wherein said syrup comprises (a) a di-functional thiol, (b) a diene-functional alkylene oxide, and (c) a multi-functional reactant having a functionality greater than two comprising a multi-ene-functional reactant, a multi-functional thiol, or a combination thereof, in which the relative amounts of said alkylene oxide, said thiol, and said multi-functional reactant having a functionality greater than two are selected such that (a) said matrix, when formed into a shape, has sufficient mechanical integrity to retain said shape under ambient conditions and (b) said composition exhibits an ionic conductivity of at least 1×10$^{-6}$ S/cm when measured in the absence of solvent at 25° C.

23. The method of claim 21 comprising coating an electrode with said syrup.

24. The method of claim 21 comprising exposing said syrup to ultraviolet radiation.

25. The method of claim 21 comprising exposing said syrup to thermal radiation.

26. The method of claim 21 comprising exposing said syrup to electron beam radiation.

27. An electrochemical cell comprising:

an anode;

a cathode; and an electrolyte composition comprising a salt disposed in a matrix comprising the crosslinked reaction product of a multi-ene-functional alkylene oxide and a multi-functional thiol, the relative amounts of said alkylene oxide and said thiol being selected such that (a) said composition, when formed into a shape, has sufficient mechanical integrity to retain said shape under operating conditions and (b) said composition exhibits an ionic conductivity of at least $1 \times 10^{-6}$ S/cm when measured in the absence of solvent at 25° C.

28. The electrochemical cell of claim 27 wherein said matrix comprises the reaction product of (a) a diene-functional alkylene oxide, (b) a di-functional thiol, and (c) a multi-functional reactant having a functionality greater than two comprising a multi-ene-functional reactant, a multi-functional thiol, or combination thereof, the relative amounts of said alkylene oxide, said thiol, and said multi-functional reactant having a functionality greater than two being selected such that (a) said composition, when formed into a shape, has sufficient mechanical integrity to retain said shape under operating conditions and (b) said composition exhibits an ionic conductivity of at least $1 \times 10^{-6}$ S/cm when measured in the absence of solvent at 25° C.

* * * * *